United States Patent [19]

Tardivel

[11] 4,059,531
[45] Nov. 22, 1977

[54] AUTOMATIC SLUDGE EXTRACTION AND WASHING DEVICE FOR USE IN A WATER TREATMENT SETTLING APPARATUS

[75] Inventor: Jacques Tardivel, Plaisir, France
[73] Assignee: Societe Degremont, Rueil-Malmaison, France
[21] Appl. No.: 768,821
[22] Filed: Feb. 15, 1977

Related U.S. Application Data

[63] Continuation-in-part of Ser. No. 595,303, July 11, 1975, abandoned.

[30] Foreign Application Priority Data

Aug. 8, 1974 France .............................. 74.27523

[51] Int. Cl.² ............................................. B01D 23/00
[52] U.S. Cl. .................................. 210/522; 210/535; 210/537
[58] Field of Search ....................... 210/19, 20, 81, 82, 210/521, 522, 533–537

[56] References Cited

U.S. PATENT DOCUMENTS

| 3,068,172 | 12/1962 | Leviel et al. | 210/19 |
| 3,272,341 | 9/1966 | Hukki | 210/522 |
| 3,320,161 | 5/1967 | Lapaix | 210/535 |
| 3,788,981 | 1/1974 | Richard et al. | 210/20 |
| 3,878,101 | 4/1975 | Kennedy | 210/536 |
| 3,886,064 | 5/1975 | Kosonen | 210/522 |
| 3,951,818 | 4/1976 | Bosnjak | 210/522 |

FOREIGN PATENT DOCUMENTS

662,647 12/1951 United Kingdom ................. 210/537

Primary Examiner—Tim R. Miles
Assistant Examiner—Gregory N. Clements
Attorney, Agent, or Firm—Wenderoth, Lind & Ponack

[57] ABSTRACT

A settling apparatus includes a decanter having a sludge bed therein. A raw water inlet leads raw water to be treated into the decanter, such that the raw water passes upwardly through the sludge bed, whereby impurities in the water are removed in the form of settling sludge, a portion of which collects in a concentrator. A vacuum source is connected to the decanter to allow for pulsating introduction of the raw water into the sludge bed. At least one siphon extends into the concentrator and is selectively connectable to the vacuum source to withdraw collected sludge from the concentrator and pass such sludge to a sludge removal station. The siphon is also selectively connectible to the vacuum source and the raw water inlet to cause raw water to be passed through the siphon and wash the concentrator and the interior of the decanter.

10 Claims, 6 Drawing Figures

AUTOMATIC SLUDGE EXTRACTION AND WASHING DEVICE FOR USE IN A WATER TREATMENT SETTLING APPARATUS

This is a continuation-in-part of application Ser. No. 595,303, filed July 11, 1975, now abandoned.

BACKGROUND OF THE INVENTION

The present invention relates to a system for selectively performing sludge extraction from a concentrator in a sludge bed settling apparatus, and also for selectively performing washing of the concentrator and the interior of the sludge bed settling apparatus.

It is known that in the treatment of used or raw water in a sludge bed type settling apparatus, a portion of the sludge resulting from such treatment must be periodically extracted from the settling apparatus. It is further known to achieve such sludge extraction by using a system of pipes provided with manually or pneumatically operated diaphragm valves, possibly connected to an automatic control and adjustment system.

However, the use of such diaphragm valves inherently involves certain inconveniences, one of which is the necessity of maintaining the value of fluid pressures employed within the system within narrow limits to avoid bursting of the diaphgrams. A further inconvenience is the need for providing a separate fluid supply to each diaphragm valve. An even further inconvenience in such known systems is the inherent risk of draining the decanting or settling apparatus when the extraction is stopped. An additional drawback of such known systems is the high cost of diaphragm valves.

The use of vacuum primed siphons to achieve sludge extraction would eliminate certain of the above disadvantages inherent in the use of diaphgram valves. However, the provision of a separate vacuum system would involve considerable extra expense.

Additionally, it is known that when a plate type settling apparatus operating according to the activated sludge bed principle is used for the water treatment operation, it is routinely necessary to wash the interior of such apparatus. Such washing operation normally must be manually carried out, and it is extremely difficult to achieve such manual washing in the area of the apparatus beneath the plates.

SUMMARY OF THE INVENTION

With the above discussion in mind, it is the primary object of the present invention to provide a device for selectively automatically extracting sludge from a concentrator in a sludge bed settling apparatus, and for also selectively automatically achieving washing of the concentrator and interior of such settling apparatus, thereby avoiding any need for manual washing operations.

It is a further object of the present invention to provide such a device which operates without the use of diaphragm valves, and to thereby avoid the inherent disadvantages thereof.

It is a yet further object of the present invention to provide such a device which is less expensive, or at least no more expensive, than previous known sludge extraction devices which are not capable of achieving an automatic washing operation.

These objects are achieved in accordance with the present invention by the provision of a system which includes at least one siphon which extends into the concentrator in the settling apparatus. The siphon is selectively connectable to a vacuum source such that sludge may be extracted from the concentrator and passed to a sludge removal station.

Further, the siphon is additionally selectively automatically connectable to the vacuum source and also to the raw water inlet which supplies raw water to be treated to the settling apparatus. Accordingly, raw water can be passed from the inlet into the siphon, and then into the concentrator. Such raw water will fill the concentrator and overflow therefrom, thereby falling onto and washing the bottom of the sludge bed settling apparatus.

In accordance with the present invention, it is preferable that connection between the siphon and the vacuum source, connection between the siphon and the atmosphere, connection between the siphon and the raw water inlet, and connection between the siphon and the sludge removal station be achieved by solenoid operated valves. Further preferably, at least the solenoid operated valve connecting the siphon with the vacuum source is arranged such that it closes connection between the siphon and the vacuum source when it is deenergized.

The system of the present invention is particularly advantageous when employed with a settling apparatus of the pulsating sludge bed type, wherein raw water to be treated is pulsatingly introduced into the sludge bed by means of a vacuum source communicating with the interior of the decanter. Specifically, when the settling apparatus is of this type, the same vacuum source which allows for pulsating introduction of the water to be treated may be employed as the vacuum source for priming the siphon. This double purpose vacuum source thus eliminates the need of the provision of a separate vacuum system for the siphon of the present invention.

Further, the use of the system of the present invention for a washing apparatus is particularly advantageous when the settling apparatus is of the plate type. Specifically, since the washing operation is achieved entirely automatically, without the need for any manual cleaning, it is possible to achieve efficient cleaning of the apparatus beneath the plates.

It is specifically to be understood that the system of the present invention may however be employed in known types of settling apparatus other than plate type settling apparatus or pulsating type settling apparatus.

BRIEF DESCRIPTION OF THE DRAWINGS

Other objects, features and advantages of the present invention will become apparent from the following detailed description of one specific preferred embodiment thereof, the invention not however being limited by such embodiment, with reference to the attached drawings, wherein:

FIG. 1b is a transverse section taken approximately along line 1b—1b of FIG. 1a;

DETAILED DESCRIPTION OF THE INVENTION

Figure 1A:
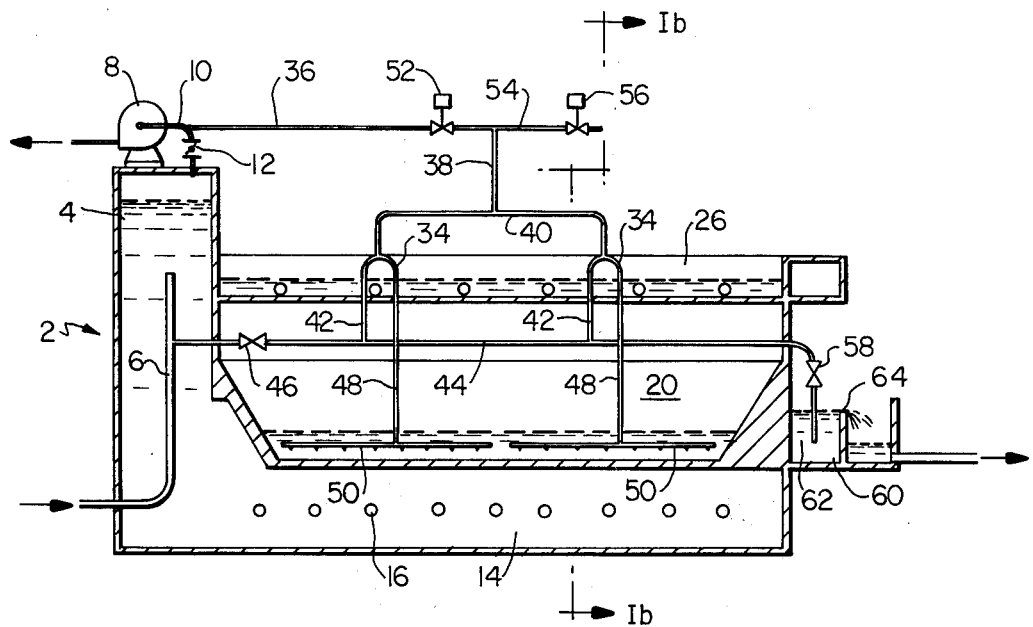
FIG. 1a is a schematic view in axial longitudinal section taken approximately through the center of a pulsated activated sludge bed settling apparatus including the system of the present invention, but with such system in an inoperative position.
Figure 1B:
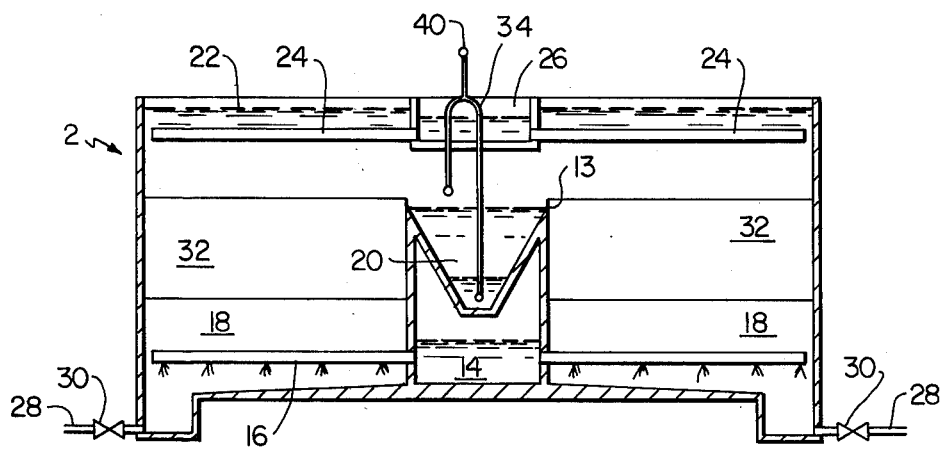

With reference now to FIGS. 1a and 1b of the drawings, the settling apparatus itself will be described. It is to be understood that the settling apparatus itself does not form the present invention. The following description will be made with reference to a pulsating sludge bed settling apparatus of the plate type. However, it is to be understood that the concept of the present invention is applicable to other known types of settling apparatus. It is however particularly preferred that the present invention be employed with a setting apparatus of the pulsating sludge bed type. Furthermore, the washing feature of the system of the present apparatus is particularly useful in a settling apparatus of the plate type, i.e., where plates extend through a portion of the settling apparatus. Particularly, the system of the present invention may be employed in such a plate type settling apparatus wherein the plates are vertically aligned or inclined to the vertical. Furthermore, the system of the present invention may be employed in a plate type settling apparatus of the type wherein the plates extend throughout the sludge bed and/or the clarifying zone of the settling apparatus. All such features regarding the arrangement and location of plates within the settling apparatus are known and do not constitute in and of themselves the concept of the present invention.

Returning now to FIGS. 1a and 1b of the drawings, a plate type settling apparatus of the pulsating sludge bed type is shown generally by the reference numeral 2 and includes a generally vertically dimensioned bell tower or chamber 4 into which water to be treated is introduced through inlet 6. A vacuum source, for example a vacuum motor or fan 8, communicates with the top of chamber 4 via a pipe 10. Pipe 10 has therein an adjustment valve 12 which may be reciprocatingly opened and closed to achieve a pulsating vacuum within chamber 4, and therefore a pulsating introduction of the fluid to be treated, such as raw sewage water, through inlet line 6. Chamber 4 communicates, at the bottom portion thereof, with a substantially horizontal bottom channel 14 extending along substantially the entire length of the settling apparatus. The water passes from bottom channel 14 laterally outwardly through branch lines 16 into a sludge bed conventionally maintained in chambers 18. These chambers 18 are located on opposite lateral sides of bottom channel 14 and extend along substantially the entire length of the settling apparatus and communicate with each other centrally of the settling apparatus at a position above a concentrator channel 20 which is vertically aligned above bottom channel 14.

The water to be treated exits from the bottom orifices or openings in branch lines 16, in a pulsating manner due to the operation of vacuum source 8 and valve 12, and passes upwardly through a sludge bed positioned within decanter chambers 18. The level of the water within chambers 18 is maintained at a level 22. During passage of the water from branch lines 16 upwardly through the sludge bed in chambers 18, impurities within the water to be treated are agglomerated and removed in the form of sludge, and such sludge settles in the downward direction. The purified water passes through openings in upper lateral pipes 24 into a purified water collection chamber 26 which extends substantially the length of the settling apparatus.

During the operation of the settling apparatus, some of the sludge will concentrate or collect in concentrator 20.

Lines 28 controlled by gate valves 30 may be provided at opposite lateral sides of the sludge bed settling apparatus to periodically remove therefrom quantities of settled sludge from the bottom of the apparatus.

Plates 32 may be provided in a known manner and in various known arrangements and locations within chambers 18 to facilitate the settling of the sludge and the upward movement of the purified water.

The above device is conventional and in and of itself does not form the present invention. However, during operation of such device, it periodically becomes necessary to remove sludge which collects in concentrator 20 and to wash the interior of the entire settling apparatus. Such operations have in the past been carried out substantially manually and are manifestly difficult and time consuming.

Accordingly, in accordance with the present invention there is provided a unique system for achieving both sludge extraction from concentrator 20 and washing of the interior of the entire sludge bed settling apparatus.

Specifically, the system of the present invention incudes at least one siphon 34, two such siphons 34 being shown in the exemplified embodiment, joined to a vacuum conduit 36 by means of suitable pipes, such as for example pipes 38 and 40.

First or higher ends 42 of siphons 34 are connected to a manifold conduit 44 which is connected by a two-way solenoid operated valve 46 to inlet conduit 6 for introducing raw water to be treated. Second or lower ends 48 of siphons 34 are connected to a pipe or pipes 50 which are positioned to extend longitudinally within concentrator chamber 20 adjacent the lower portion thereof.

Vacuum conduit 36 is connected through pipe 10 with vacuum source 8. A two-way solenoid operated valve 52 is inserted in conduit 36 between vacuum source 8 and siphons 34. A branch section 54 of conduit 36 communicates with the atmosphere through another two-way solenoid operated valve 56.

Conduit 44 has at the free end thereof a solenoid operated valve 58 for discharging material from line 44 into a priming pot 60 containing a water reservoir 62. Priming pot 60 is provided with an adjustable overflow weir 64, whereby the rate of sludge removal from concentrator 20 by siphons 34 can be adjusted.

With the above description in mind, the system of the present invention and its various relationships with the settling apparatus will now be described.

During normal operation of the settling apparatus, as discussed above, the system of the present invention is inoperative. That is, during such normal operation, neither sludge extraction nor washing are carried out.

During such normal operation, valve 52 is closed such that siphons 34 are not under vacuum. Valve 56 is open to expose siphons 34 to the atmosphere. Valve 46 is closed to block connection between raw water inlet 6 and manifold conduit 44. Gate valves 30 are closed.

Under the above conditions, the sludge extraction and washing system of the present invention is inoperative, and the settling apparatus operates as described previously.

Figure 2A:
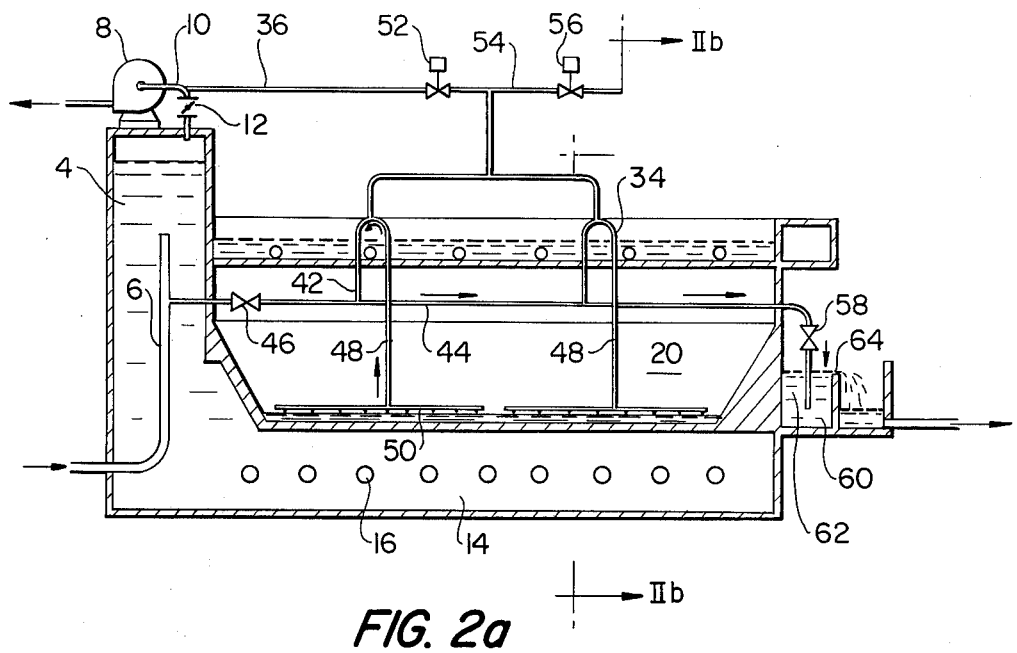
FIGS. 2a and 2b are views similar to FIGS. 1a and 1b, respectively, but with the system of the present invention operative for sludge extraction.
Figure 2B:
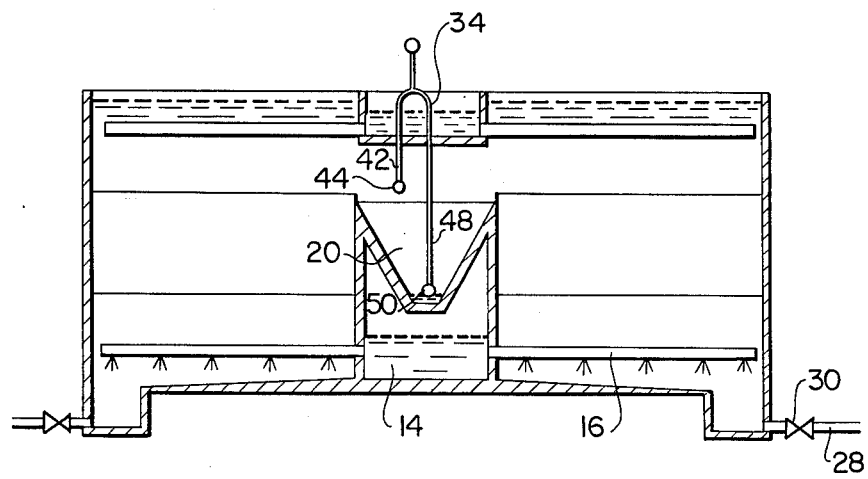

After the settling apparatus operates for a given amount of time, it becomes desirable to remove a portion of the sludge which has collected in concentrator 20. In accordance with the present invention, such sludge extraction can be achieved while the settling apparatus remains in operation. This operation will now be described with reference to FIGS. 2a and 2b of the drawings.

Specifically, as stated above, raw water continues to be introduced into the settling apparatus and treated in the normal manner. However, valve 56 is closed, and valve 52 is opened, to subject siphons 34 to vacuum. Solenoid operated valve 46 remains closed, but solenoid operated valve 58 is opened.

The vacuum created in the siphons 34 causes sludge in the bottom of concentrator 20 to be sucked through the openings in pipe or pipes 50 through the lower ends 48 of the siphons 34, and from the upper ends 42 of the siphons 34 into manifold conduit 44. The sludge is then discharged into priming pot 60. The rate at which the sludge is extracted by the siphons 34 is a function of the height between the level 22 of the water in the settling apparatus and the adjustable level of overflow weir 64.

The vacuum applied to siphons 34 can readily be controlled such that fluid will pass from one end thereof to the other end thereof, rather than passing upwardly through pipes 40, 38 and 36. Such control would however be achieved by normal design considerations which would be readily understood by any ordinarily skilled engineer, and thus such considerations are not described herein.

Accordingly, by the above described operation, a desired amount of sludge may be removed from concentrator 20 during the otherwise normal operation of the settling apparatus.

It is to be understood however that the sludge extraction operation may also be carried out when the settling apparatus is not in operation.

Figure 3A:
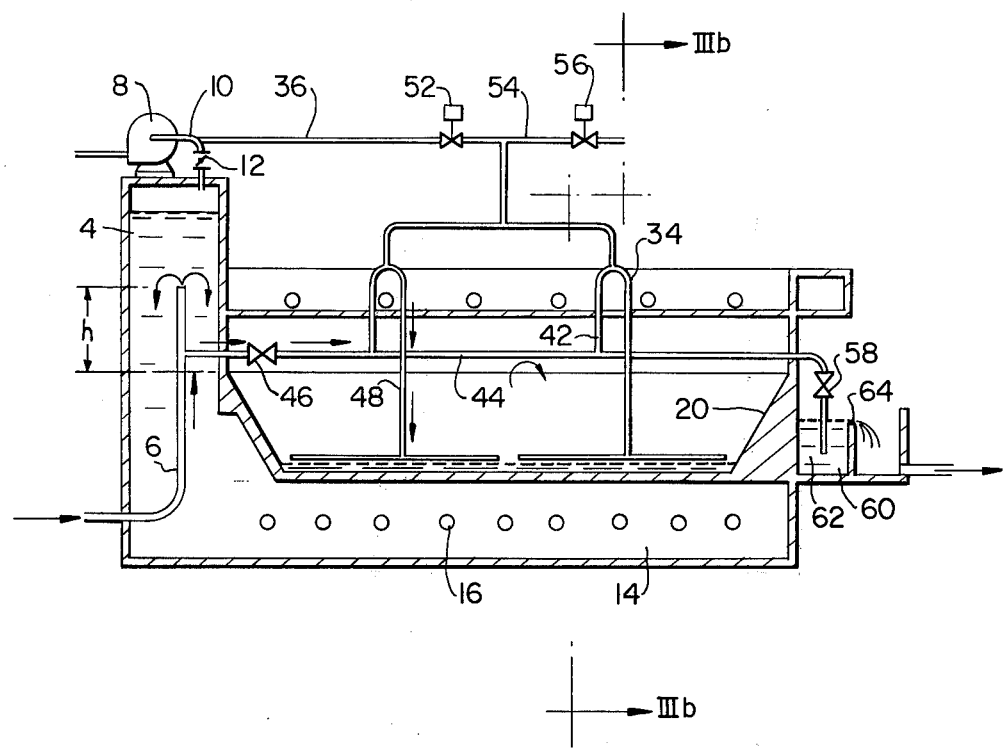
FIGS. 3a and 3b are views similar to FIGS. 1a and 1b, respectively, but with the system of the present invention operative for washing the settling apparatus.

After the settling apparatus has been operated for a given length of time, it becomes necessary to wash and clean the interior of the settling apparatus. Such washing operation may be achieved in accordance with the present invention as follows, with reference to FIGS. 3a and 3b of the drawings.

Initially, the settling apparatus must be drained of water. For this purpose, valves 46, 52 and 58 are closed. Valves 56 and 28 are opened, thereby allowing all water within the settling apparatus to drain therefrom.

Figure 3B:
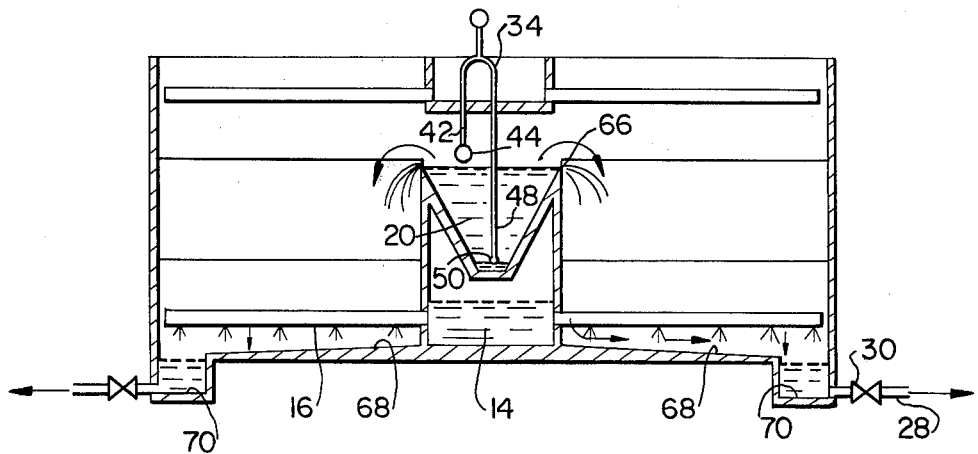

After the settling apparatus is completely emptied, valve 56 is closed, and valves 52 and 46 are opened. Opening of valve 52 places siphons 34 under vacuum. Opening of valve 46 allows raw water passing through inlet 6 to move into manifold conduit 44. Since valve 58 is closed, the raw water passes from manifold conduit 44 through upper ends 42 of siphons 34. The raw water passes from lower ends 48 of siphons 34 into pipe or pipes 50 and passes through the orifices or openings therein into concentrator 20. The raw water fills up concentrator 20 and overflows the opposite lateral edges 66 thereof, throughout the entire length thereof. This raw water thus is distributed throughout the length of the settling apparatus and sweeps or falls to bottom surfaces 68 thereof from the height of overflow edges 66, which in a practical operating apparatus would be a substantial height, for example a height of approximately 10 feet. It will be apparent that this action of the water falling onto surfaces 68 from such a height, and throughout the entire length of the settling apparatus, will provide a very efficient cleaning action. The amount of water introduced into manifold conduit 44 may be selected to produce a sweeping action of the water falling onto surfaces 68 of a strength sufficient to remove therefrom any sludge remaining thereon. To aid this action, surfaces 68 are sloped outwardly and downwardly, as shown in FIG. 3b.

The washing operation is further facilitated by the fact that raw water will be supplied through bottom channel 14 and lateral pipes 16 to be sprayed onto surfaces 68, thereby further washing such surfaces.

The sludge thus removed from surfaces 68 passes to recovery or collector channels 70, from which the sludge may be discharged by means of conduits 28 controlled by gate valves 30.

The outlet end of raw water inlet conduit 6 is advantageously located a height $h$ of 1 to 1.2 meters above the level of concentrator overflow edges 66, so that the water output introduced into the manifold conduit 44 will be sufficient for washing the surfaces 68 of the settling apparatus. A suitable output rate might be for example approximately 400 cubic meters per hour (14,125 cubic feet per hour).

During the above described washing operation, the raw water fed into the settling apparatus through inlet conduit 6 may be introduced under normal or non-pulsating conditions.

It will be apparent from the above description that the system of the present invention may be operated automatically to extract sludge and to wash the settling apparatus, without the need for any manual extraction or washing operations.

The system of the present invention has several advantages over previously known sludge extraction systems which employ therein diaphragm valves. Specifically, in accordance with the system of the present invention it is possible to completely avoid the use of diaphragm valves, and to accordingly reduce the diameter of the pipes employed for sludge extraction, in view of the absence of pressure losses which would otherwise be caused by diaphragm valves. Further, it is possible to reduce the number of pipes and conduits employed in the present system, since the downstream section or sections of the siphons are connected to a common manifold.

Further, it is possible to avoid any risk of accidential extraction, since solenoid operated valve 52 may readily be of the type which is closed when not energized. Thus, in the event of any failure of the main supply, the siphons cannot be placed under vacuum.

It should be apparent from the foregoing description that, given an equal diameter of the piping system, the device of the present invention permits sludge to be extracted at a cost which is considerably lower than that of conventional extraction systems which are equipped with diaphragm valves.

In the particularly preferred embodiment of the present invention, as described with reference to the drawings, the vacuum source which achieves a reduced pressure in the siphons is the same vacuum source which is used to achieve a pulsating introduction of the raw water into the sludge bed. Thus, the system of the present invention is particularly advantageous when used with a settling apparatus of the pulsating sludge bed type.

Even further, it is possible with the present invention to not only achieve automatic sludge extraction, but to also avoid the previously necessary tedious and time consuming manual washing of the interior of the settling apparatus. That is, in accordance with the present invention, it is possible to achieve, at a cost which compares favorably with that of a conventional sludge extraction system, a device which is also capable of automatically cleaning out the interior of the settling apparatus.

Various modifications may be made to the specific structural arrangements described above without departing from the scope of the present invention. It is specifically to be understood that the concept and system of the present invention may be employed in other types of settling apparatus other than the plate type, pulsating sludge bed settling apparatus described and illustrated herein.

What is claimed is:

1. In a sludge bed settling apparatus of the type including a decanter containing therein a sludge bed, means for introducing fluid to be treated into said decanter and for passing said fluid upwardly through said sludge bed, whereby impurities are removed in the form of settling sludge, and a sludge concentrator for collecting a portion of said sludge; the improvement of means for selectively extracting sludge from said concentrator and for selectively washing said concentrator and decanter, said extracting and washing means comprising:

at least one siphon having a first end extending into said concentrator and a second end;

a manifold conduit extending from said fluid introducing means to a sludge removal station, said second end of said siphon being connected to said manifold conduit;

a vacuum source;

first valve means selectively movable from a first position connecting said siphon to said vacuum source to a second position blocking connection between said siphon and said vacuum source;

second valve means selectively movable from a first position connecting said siphon to atmosphere and a second position blocking said siphon from atmosphere;

third valve means selectively movable from a first position connecting said manifold conduit to said fluid introducing means and a second position blocking connection between said manifold conduit and said fluid introducing means;

fourth valve means selectively movable from a first position connecting said manifold conduit to said sludge removal station to a second position blocking connection between said manifold conduit and said sludge removal station;

whereby, when said first, second, third and fourth valve means are respectively in said first, second, second and first positions thereof sludge in said concentrator is sucked by said vacuum source into said first end of said siphon, out said second end of said siphon into said manifold conduit, and from said manifold conduit to said sludge removal station, thereby achieving a sludge extraction operation; and whereby, when said first, second, third and fourth valve means are respectively in said first, second, first and second positions thereof, fluid passes from said fluid introducing means into said manifold conduit, is sucked by said vacuum source into said second end of said siphon, passes through said first end of said siphon into said concentrator, thereby washing said concentrator, and overflows said concentrator, thereby falling onto and washing the bottom of said decanter, thereby achieving a washing operation.

2. The improvement claimed in claim 1, wherein said sludge removal station comprises a siphon priming pot having an overflow of adjustable height.

3. The improvement claimed in claim 1, wherein said first, second, third and fourth valve means comprise solenoid operated valves.

4. The improvement claimed in claim 3, wherein at least said first solenoid operated valve is deenergized when in said second position thereof.

5. The improvement claimed in claim 1, wherein said fluid introducing means comprises an inlet conduit extending into said decanter.

6. The improvement claimed in claim 5, wherein said decanter includes a vertically extending inlet chamber, a horizontally extending bottom channel connected to said inlet chamber at the bottom thereof, at least one decanter chamber positioned laterally of said bottom channel, and lateral pipes extending from said bottom channel into said decanter chamber, said lateral pipes having orifices therein, said sludge bed being positioned in said at least one decanter chamber, said inlet conduit extending into said inlet chamber, whereby during said washing operation fluid additionally passes from said inlet conduit, to said inlet chamber, to said bottom channel, to said lateral pipes, through said orifices, and downwardly onto said bottom of said decanter, thereby achieving further washing.

7. The improvement claimed in claim 6, wherein decanter chambers are positioned on opposite lateral sides of said bottom channel.

8. The improvement claimed in claim 1, wherein said settling apparatus is of the pulsating sludge bed type, and further comprising means for causing said fluid to pulsate as it enters said decanter.

9. The improvement claimed in claim 8, wherein said pulsating means comprises vacuum means connected to said decanter for pulsatingly reducing the pressure in said decanter, said vacuum means comprising said vacuum source.

10. The improvement claimed in claim 1, wherein said settling apparatus is of the plate type, and further comprising plates positioned within said decanter, said fluid passing upwardly through said plates.

* * * * *